(12) United States Patent
Yoshida

(10) Patent No.: US 12,052,398 B2
(45) Date of Patent: Jul. 30, 2024

(54) PRECISION OF FLATBED OR ADF DOCUMENT READING BY DETECTING DIFFERENT REFERENCE POSITIONS DRIVING IMAGE SENSOR IN DIFFERENT DIRECTIONS TO READ REFERENCE PLATE

(71) Applicant: CANON KABUSHIKI KAISHA, Tokyo (JP)

(72) Inventor: Tsuyoshi Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/455,389

(22) Filed: Aug. 24, 2023

(65) Prior Publication Data
US 2024/0073340 A1    Feb. 29, 2024

(30) Foreign Application Priority Data
Aug. 26, 2022    (JP) .................................. 2022-135204

(51) Int. Cl.
| | |
|---|---|
| *H04N 1/047* | (2006.01) |
| *H04N 1/031* | (2006.01) |
| *H04N 1/10* | (2006.01) |
| *H04N 1/12* | (2006.01) |
| *H04N 1/40* | (2006.01) |

(52) U.S. Cl.
CPC ........... *H04N 1/047* (2013.01); *H04N 1/0312* (2013.01); *H04N 1/0318* (2013.01); *H04N 1/1017* (2013.01); *H04N 1/1043* (2013.01); *H04N 1/1225* (2013.01); *H04N 1/1235* (2013.01); *H04N 1/1295* (2013.01); *H04N 1/40056* (2013.01)

(58) Field of Classification Search
CPC .... H04N 1/047; H04N 1/0312; H04N 1/0318; H04N 1/1017; H04N 1/1043; H04N 1/1225; H04N 1/1235; H04N 1/1295; H04N 1/40056
See application file for complete search history.

(56) References Cited

U.S. PATENT DOCUMENTS 7,821,685 B2 *  10/2010  Yoshihisa ............ H04N 1/1017
                                                                358/406
9,578,204 B2 *   2/2017  Kii ......................... H04N 1/401
(Continued)

FOREIGN PATENT DOCUMENTS

| JP | 2008271464 A | 11/2008 |
|---|---|---|
| JP | 2012235192 A | 11/2012 |

*Primary Examiner* — Scott A Rogers
(74) *Attorney, Agent, or Firm* — Canon U.S.A., Inc. I.P. Division

(57) ABSTRACT

An image reading apparatus, includes an image sensor, a drive mechanism configured to cause the image sensor to move in a first direction and a second direction opposite to the first direction, a reference plate, and a control unit configured to execute a first reading method of detecting a first reference position by driving the image sensor in the first direction and reading the reference plate, thereafter reading a document by driving the image sensor in the first direction, and a second reading method of detecting a second reference position by driving the image sensor in the second direction and reading the reference plate, and thereafter reading a document by driving the image sensor in the second direction.

16 Claims, 13 Drawing Sheets

(56) References Cited

U.S. PATENT DOCUMENTS

| | | | |
|---|---|---|---|
| 9,948,812 B2 * | 4/2018 | Mori | H04N 1/00689 |
| 11,233,914 B2 * | 1/2022 | Miyamoto | H04N 1/00748 |
| 2022/0311896 A1 * | 9/2022 | Kawasaki | H04N 1/00816 |

* cited by examiner

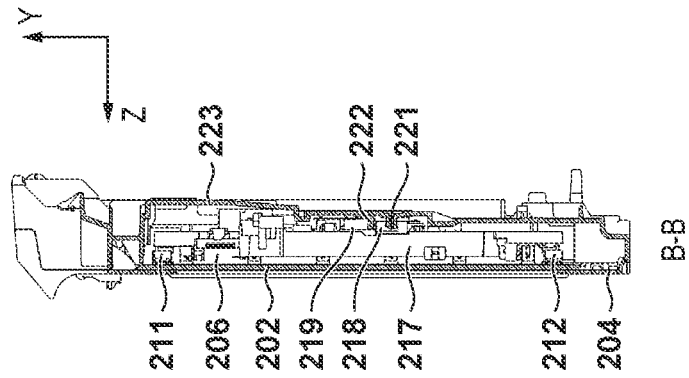
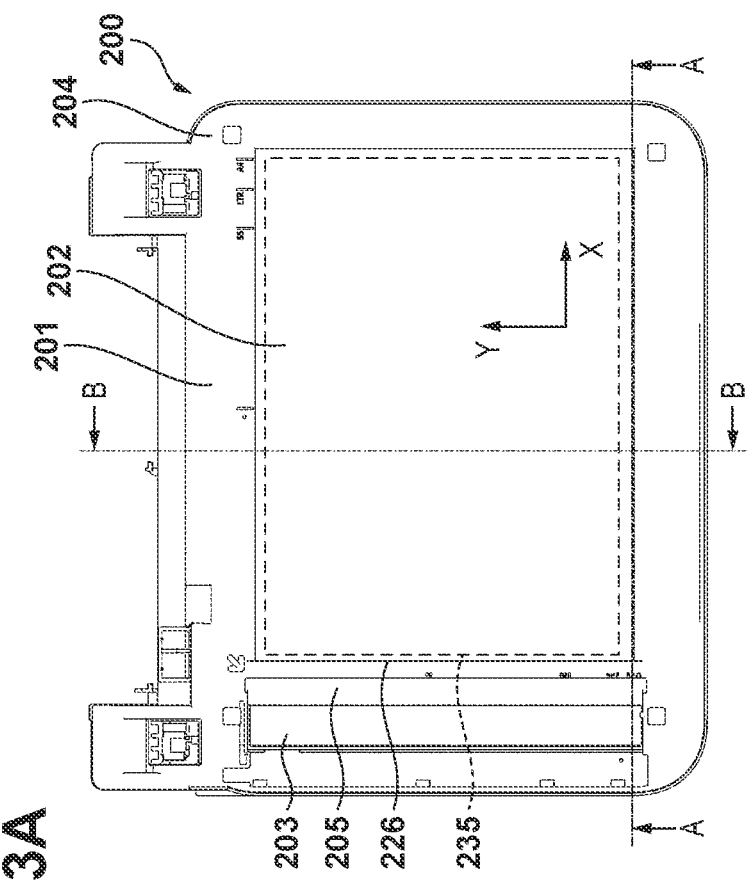
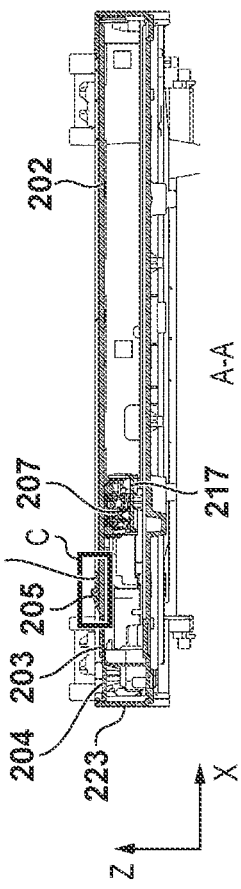

ENLARGED VIEW OF C PORTION

ENLARGED VIEW OF C PORTION

F I G. 12
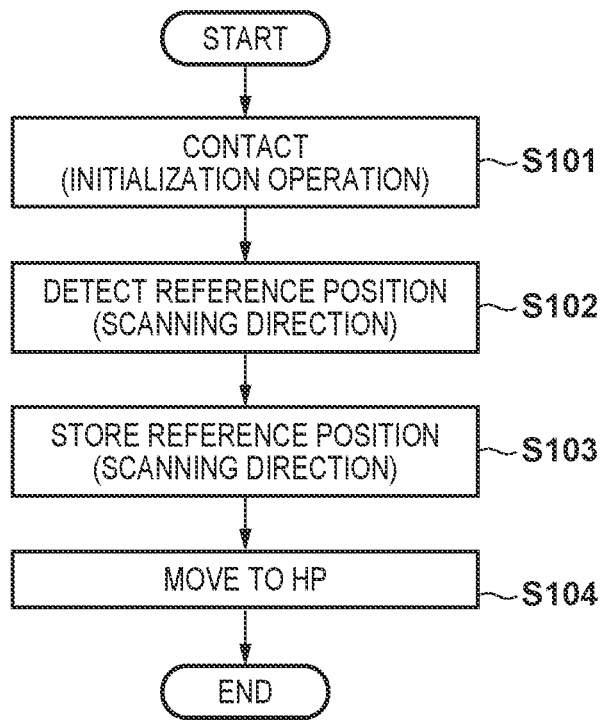
F I G. 13
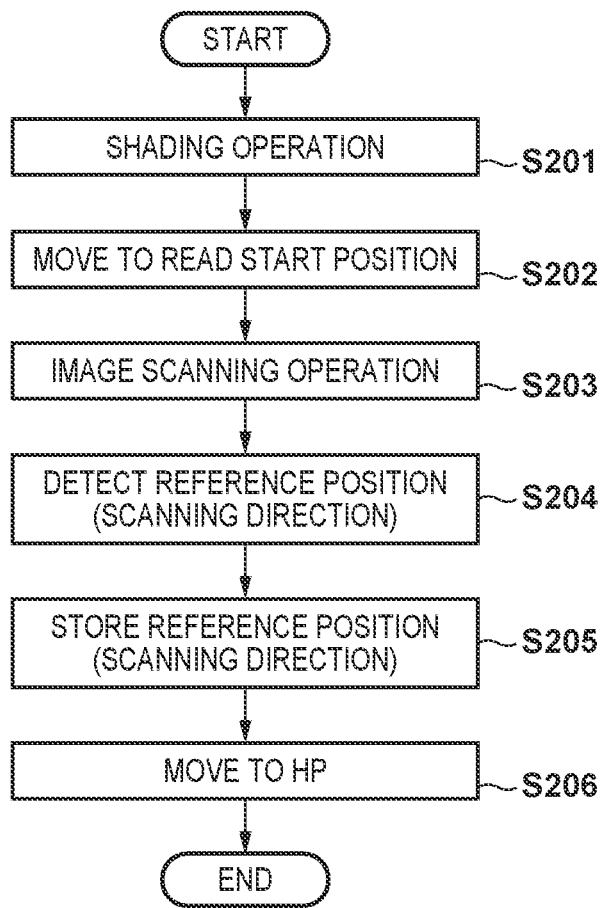

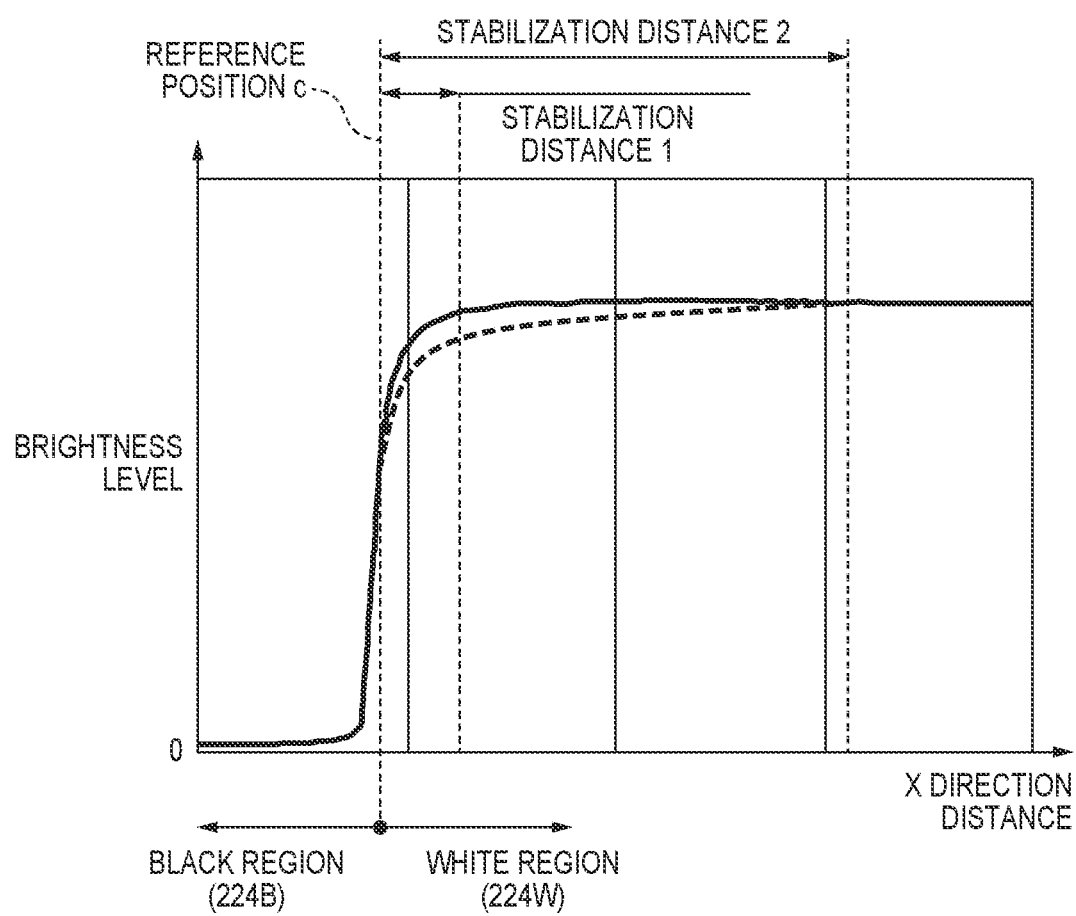

PRECISION OF FLATBED OR ADF DOCUMENT READING BY DETECTING DIFFERENT REFERENCE POSITIONS DRIVING IMAGE SENSOR IN DIFFERENT DIRECTIONS TO READ REFERENCE PLATE

BACKGROUND

Field

The present disclosure relates to an image reading apparatus for reading an image of a document, and more particularly, to an image reading apparatus capable of executing both a fixed document reading method and a document conveyance reading method as methods of reading a document.

Description of the Related Art

Conventionally, copying machines and multifunction peripherals on which an image reading apparatus for reading an image recorded on a document is mounted are known. Such an image reading apparatus is a so-called flatbed scanner, and includes a document platen glass on which a document can be placed, and an image sensor unit that is arranged immediately below the document platen glass so as to be able to move back and forth in parallel with the document platen glass surface. The image sensor unit is a unit in which an image sensor having a substantially rectangular parallelepiped housing such as a contact image sensor (CIS) is mounted on a holding member.

Some image reading apparatuses include an automatic document feeder (ADF). In the ADF document conveyance process, the document passes over an ADF glass for reading the moving document, and an image of the document is read by an image sensor unit fixedly arranged directly under ADF glass.

As a configuration of an image reading apparatus in which an automatic document feeder is mounted, a configuration disclosed in Japanese Patent Laid-Open No. 2008-271464 is known. An image reading apparatus disclosed in Japanese Patent Laid-Open No. 2008-271464 is provided with a white sheet for color correction of an image sensor, and determines a border between a white image of the white sheet and a density image that is continuous with the white image, and sets the border as a reference position.

However, in the configuration of Japanese Patent Laid-Open No. 2008-271464, the reference position is detected in only one of the scanning direction and the return direction. For this reason, in an image reading apparatus capable of reading by both a flatbed reading method and an ADF reading method, there is a problem in that either a read start position or a read position will be shifted in proportion to backlash, and reading precision will deteriorate.

SUMMARY

Various embodiments of the present disclosure have been made in view of the above-described problems, and provides an image reading apparatus capable of improving the reading precision of a document at the time of reading each of a flatbed reading method and an ADF reading method.

According to one embodiment of the present disclosure, there is provided an image reading apparatus, comprising: an image sensor in which a light receiving element is arranged in a predetermined direction for reading a document; a drive mechanism configured to cause the image sensor to move in a first direction intersecting the predetermined direction and a second direction opposite to the first direction; a reference plate; and a control unit configured to execute a first reading method of detecting a first reference position by driving the image sensor in the first direction and reading the reference plate, thereafter reading a document by driving the image sensor in the first direction, and a second reading method of detecting a second reference position by driving the image sensor in the second direction and reading the reference plate, and thereafter reading a document by driving the image sensor in the second direction.

According to a second embodiment of the present disclosure, there is provided a method for controlling an image reading apparatus comprising: an image sensor in which a light receiving element is arranged in a predetermined direction for reading a document; a drive mechanism configured to cause the image sensor to move in a first direction intersecting the predetermined direction and a second direction opposite to the first direction; and a reference plate, the method comprising: executing a first reading method of detecting a first reference position by driving the image sensor in the first direction and reading the reference plate, thereafter reading a document by driving the image sensor in the first direction, and a second reading method of detecting a second reference position by driving the image sensor in the second direction and reading the reference plate, and thereafter reading a document by driving the image sensor in the second direction.

Further features of the present disclosure will become apparent from the following description of exemplary embodiments with reference to the attached drawings.

BRIEF DESCRIPTION OF THE DRAWINGS

FIGS. 3A to 3D are plan views and cross-sectional views of the image reading apparatus where the automatic document feeder is removed according to one embodiment.

FIG. 12 is an operation sequence diagram when the power is turned on.

FIG. 13 is an operation sequence diagram for flatbed reading according to one embodiment.

FIG. 15 is a diagram illustrating a distribution of a brightness level of an image resulting from reading a white sheet according to one embodiment.

DESCRIPTION OF THE EMBODIMENTS

Figure 1:
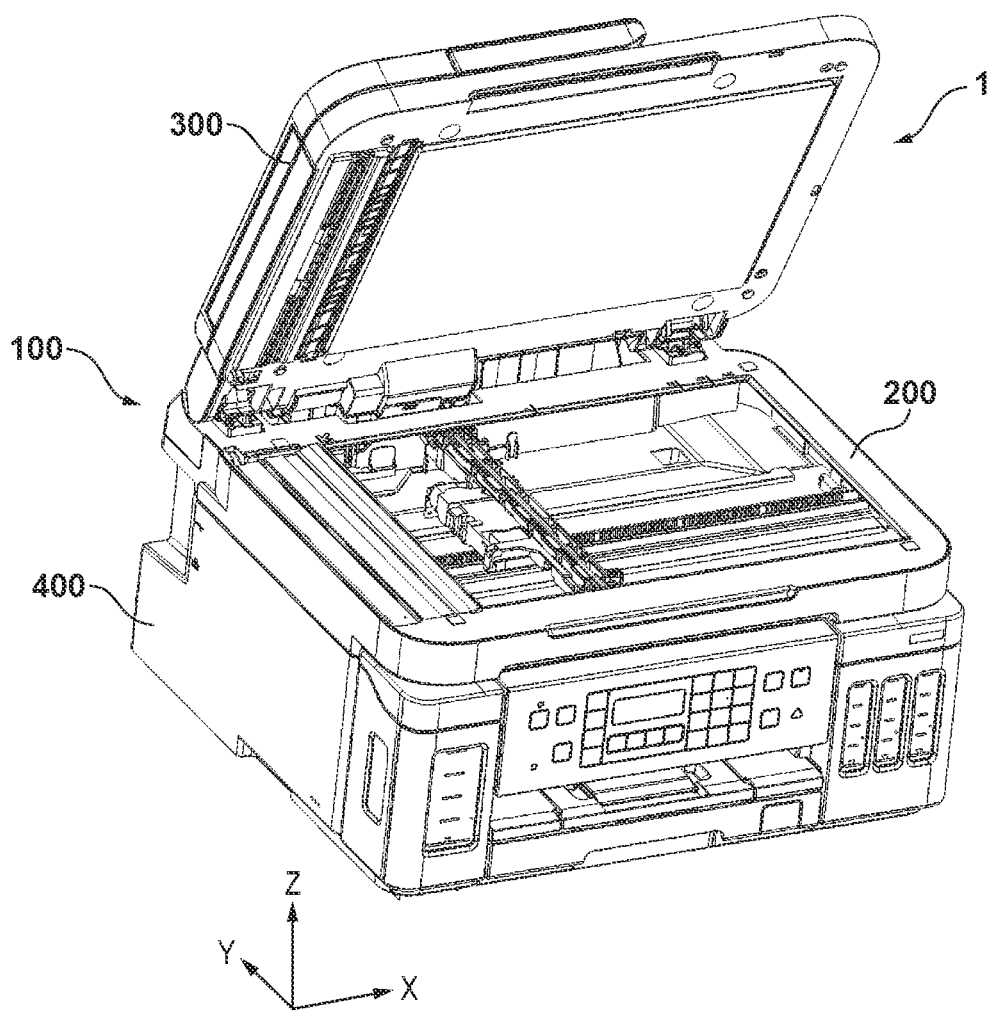
FIG. 1 is a perspective view of a state in which an automatic document feeder of an image reading apparatus according to an embodiment is open according to one embodiment.

Hereinafter, various embodiments will be described in detail with reference to the attached drawings. Note, the following embodiments are not intended to limit the scope of the claimed invention. Multiple features are described in the embodiments, but limitation is not made to embodiments that requires all such features, and multiple such features may be combined as appropriate. Furthermore, in the attached drawings, the same reference numerals are given to the same or similar configurations, and redundant description thereof is omitted.

An image reading apparatus of various embodiments of the present disclosure in which an automatic document feeder (hereinafter ADF) is mounted can be applied to a flatbed scanner apparatus, a copying machine in which a flatbed scanner apparatus and a printing apparatus are combined, a facsimile machine, a multifunction machine, or the like. Hereinafter, an example of a multifunction peripheral in which an image reading apparatus for reading a document image into a computer or the like and a printing apparatus are integrated will be described.

FIG. 1 is an external perspective view of a multifunction peripheral 1 in which an image reading apparatus 100 according to an embodiment of the present disclosure is combined with a printing apparatus 400 which is an ink jet printer. The image reading apparatus 100 of the present embodiment is configured to be roughly divided into an image reading unit 200 (hereinafter referred to as a "scanner unit") and an ADF unit 300. FIG. 1 illustrates a state in which the ADF unit 300 which is for feeding documents (not illustrated) to the scanner unit 200 is open.

Hereinafter, the configuration of the ADF unit 300 of the image reading apparatus 100 will be described with reference to FIG. 2.

Figure 2:
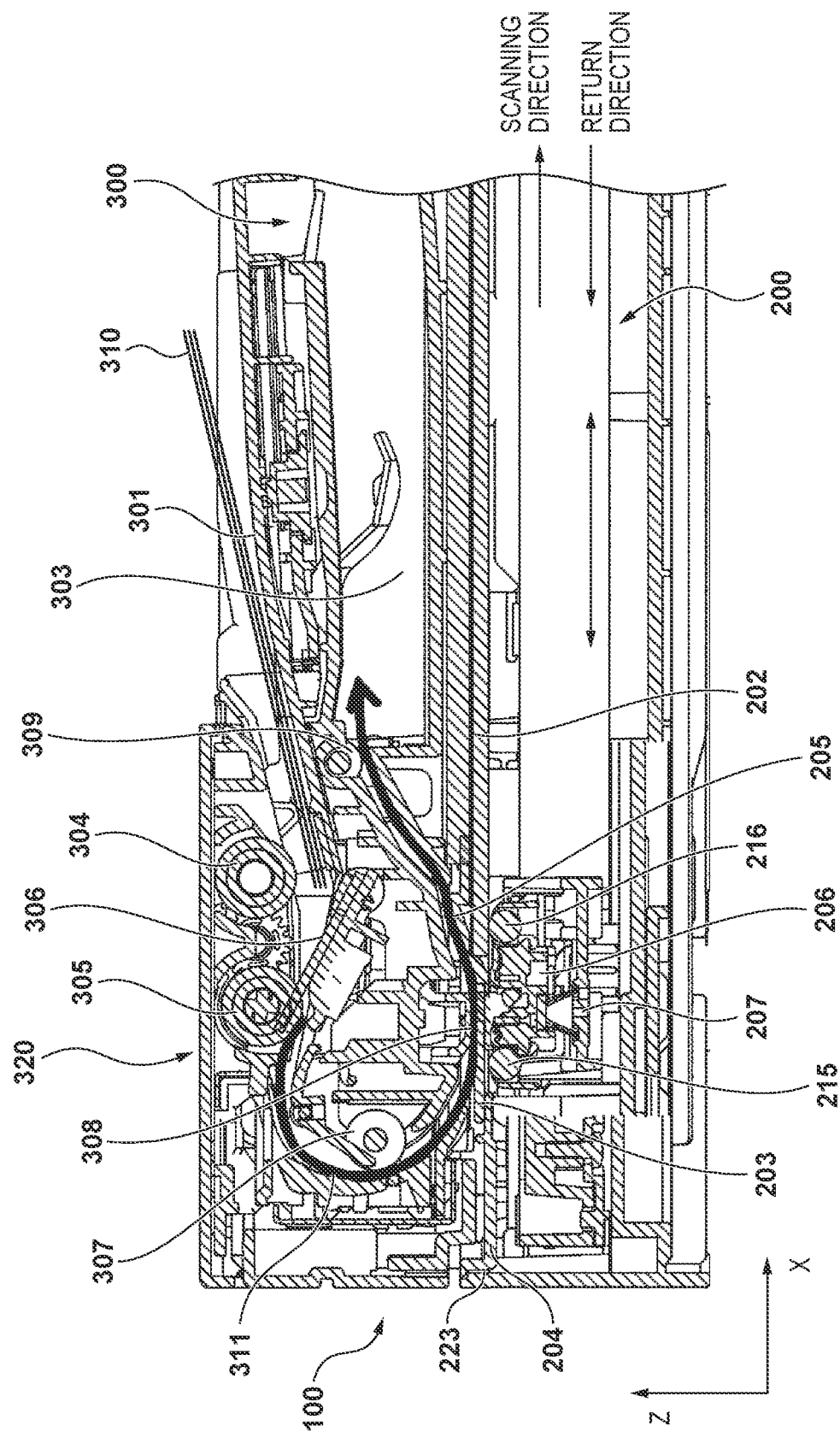
FIG. 2 is a sectional view of the image reading apparatus in a state where the automatic document feeder is closed according to one embodiment.

FIG. 2 is an X-Z cross-sectional view of the image reading apparatus 100 in which a state of the ADF unit 300 is closed against the scanner unit 200. A thick solid arrow in FIG. 2 indicates a document conveyance path 311 in the ADF unit 300, and a portion of the scanner unit 200 is used as a portion of the document conveyance path 311.

The ADF unit 300 includes a document positioning plate 301 on which a document is placed, a document conveyance mechanism 320, and a document discharge unit 303. Hereinafter, the configuration of the document conveyance mechanism 320 will be described in order from the upstream side in the document conveyance direction. Here, the document conveyance mechanism 320 refers to the entire document conveyance mechanism from a pickup roller 304 to a sheet discharge roller 309, which will be described below.

Documents 310 to be automatically conveyed, which are mounted on the document positioning plate 301, are conveyed to a separation roller 305 side by the pickup roller 304 of the document conveyance mechanism 320, and then separated one by one by the separation roller 305 and a separation pad 306, and conveyed to a conveyance roller 307 on the downstream side.

Next, the document 310 is conveyed onto the downstream ADF glass 203 by the conveyance roller 307, and is pressed by a pressure plate 308 to bring the document 310 into close contact with the ADF glass 203 when it passes over the ADF glass 203. At this time, the document 310 is read by an image sensor 206 which will be described later.

Next, the document 310, after passing over the ADF glass 203, is separated from the ADF glass 203 by a document separation surface 205 on the downstream side of the ADF glass 203, and is discharged to the document discharge unit 303 by the sheet discharge roller 309 on the downstream side. The ADF glass 203 and the document separation surface 205 are constituent members of the scanner unit 200. Here, various document detection sensors (not illustrated) are disposed in the document conveyance mechanism 320, and detect the passage of the leading edge and the trailing edge of the document, and an output signal thereof is used for timing control of reading by the image sensor 206.

The image reading apparatus 100 of the present embodiment is configured to be capable of executing two document reading methods, a fixed document reading method (flatbed reading method) and a document conveyance reading method (ADF reading method), as a document reading method. The fixed document reading method is a method in which the document 310 is fixed on a document platen glass 202 and the document is read by moving a reading unit 207 in X direction orthogonal to Y direction. Further, the document conveyance reading method is a method in which the reading unit 207 is fixed at a predetermined position (an ADF position) below the ADF glass 203, and the document 310 is read while being conveyed by the ADF unit 300.

FIG. 2 illustrates a state in which the reading unit 207 in the scanner unit 200 stands by at the ADF position in order to read the document 310 automatically conveyed by the previously-described ADF unit 300.

Hereinafter, the configuration of the scanner unit 200 of the image reading apparatus 100 will be described with reference to FIG. 3A to FIG. 8.

FIG. 3A is a plan view of the scanner unit 200 in a state in which the ADF unit 300 is removed from the image reading apparatus 100, and FIG. 3A illustrates the entire glass frame unit 201. The glass frame unit 201 is configured to include the document platen glass 202 which is for placing the document 310, and a glass frame 204 which holds the ADF glass 203 which is for reading an automatically conveyed document. The glass frame 204 includes the previously-described document separation surface 205 and a document contact reference 226, which are part of the document conveyance path, between the document platen glass 202 and the ADF glass 203.

Figure 3D:
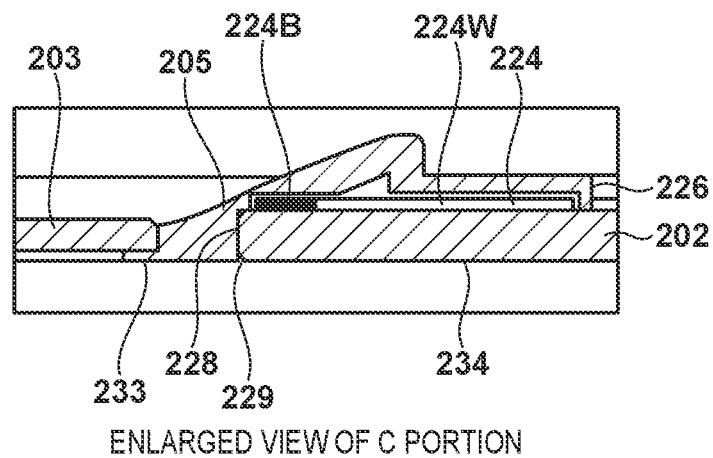

FIG. 3B is an A-A cross-sectional view of FIG. 3A. FIG. 3C is a B-B cross-sectional view of FIG. 3A and illustrates Y direction cross-section of the reading unit 207. FIG. 3D is an enlarged view of a C portion around the document separation surface 205 in FIG. 3B.

In FIG. 3D, a glass frame guide surface 233 that is a part of passages D1 and D2 of the rollers of the image sensor 206 illustrated in FIG. 4 to be described later is provided on the back surface side of the document separation surface 205.

The glass frame guide surface 233 is configured to be substantially flush with a back surface 234 of the document platen glass 202 so that the image sensor 206 can stably move. However, there is a step formed by a glass frame contact portion 228 and a chamfered portion 229 of the document platen glass 202.

A white sheet (white reference plate) 224 is arranged on the document placement surface side of the document platen glass 202. In the white sheet 224, a white region 224W and a black region (a region in which the density of the color differs from that of the white region) 224B are formed. The black region 224B is arranged closer to the return direction side of the reading unit 207 than the white region 224W. In FIG. 3D, the white region 224W and the black region 224B are simplified, but in practice, the white region 224W and the black region 224B have a configuration as described later with reference to FIG. 4.

Figure 4:
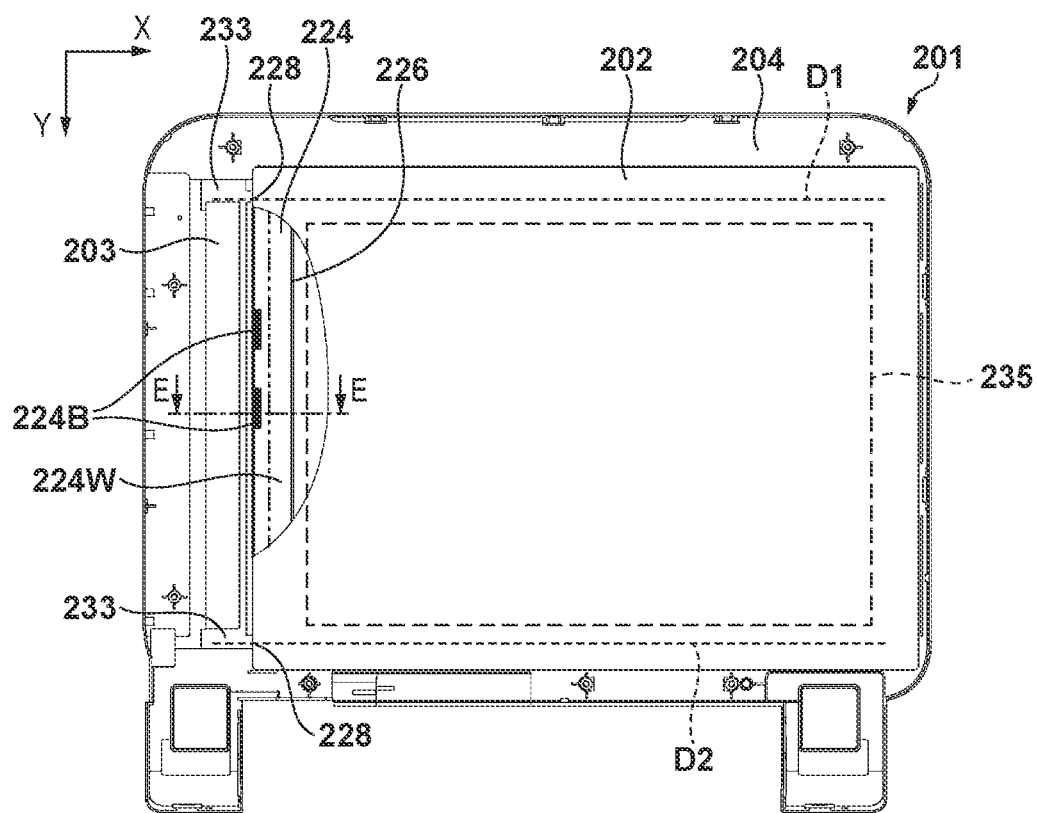
FIG. 4 is a back-side view of a glass frame unit according to one embodiment.

FIG. 4 is a back-side view of the glass frame unit 201 of FIG. 3A, with a portion of the white sheet 224 illustrated. The document platen glass 202 is brought into contact with the two glass frame contact portions 228 of the glass frame 204, and the position in the X direction is determined. The white sheet 224 is arranged on the back side of the document platen glass 202 in the direction in which FIG. 4 is viewed, and its surface is the same as the document placement surface.

In FIG. 4, the arrangement position of the white sheet 224 in the X-direction is set between the ADF glass 203 and a fixed document reading area 235. In addition, the white sheet 224 integrally includes a white region 224W (a region of a two short-dash one long-dash line in the drawing and the side of the surface with which the document contacts) for performing shading correction of the image sensor 206, and a black region 224B serving as a reference position of the image sensor 206 in X direction described in FIG. 6. To perform the shading process, the white sheet 224 has a size that covers the entire area of the image sensor 206 in the Y direction described in FIG. 6. The position of the black region 224B in the X direction in the white sheet 224 is formed closer to the ADF glass 203 than the white region 224W.

Figure 5A:
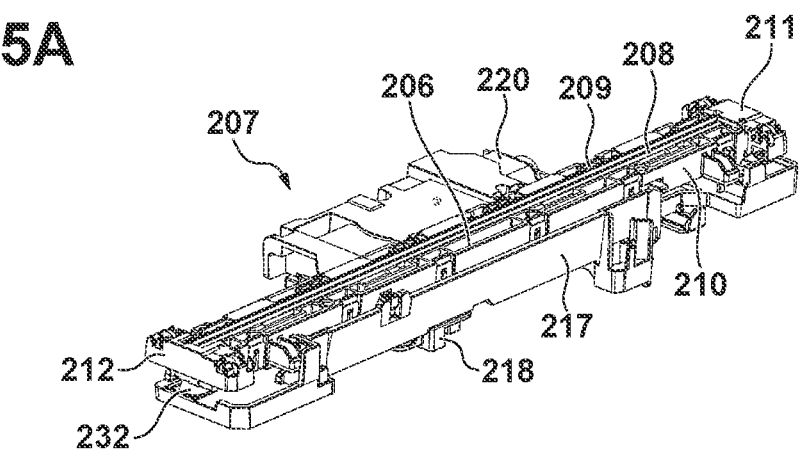
FIGS. 5A to 5D are perspective views of a reading unit according to one embodiment.
Figure 5B:
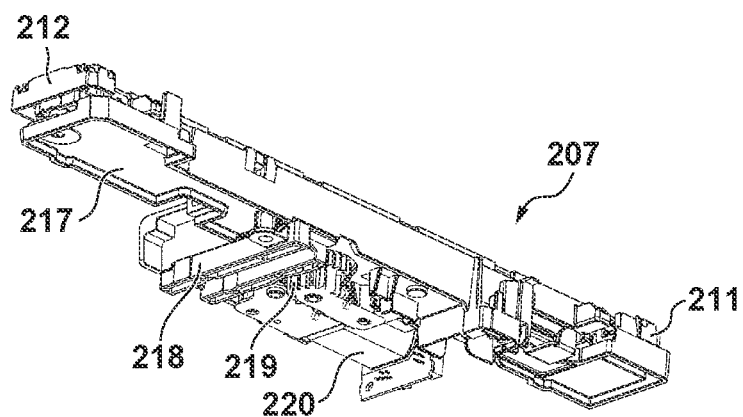

FIGS. 5A to 5D are perspective views of the reading unit 207 that reads images of the document 310; FIG. 5A is a view of the reading unit 207 viewed from above, and FIG. 5B is a view of the reading unit 207 viewed from below.

The reading unit 207 is configured to include the image sensor 206, a sensor holder 217, a slider 218, and a driving unit, which scan-drives the reading unit 207. The driving unit is configured to include a motor 220 which is a drive source, a speed reduction mechanism including a motor gear 225 that transmits a driving force of the motor 220, and a drive gear 219.

Figure 5C:
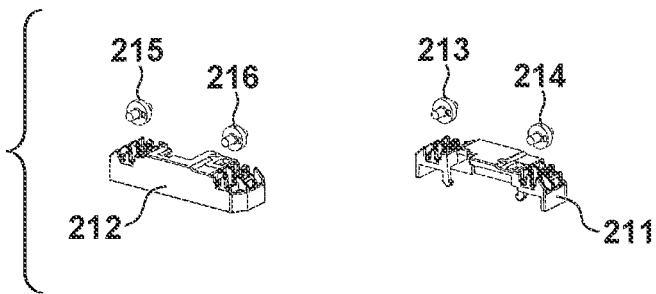

At both ends of the image sensor 206 in the Y direction, a roller unit 211 and a roller unit 212 that guarantee a focal length with respect to the document 310 to be read are arranged. As illustrated in FIG. 5C, rollers 213 and 214 and rollers 215 and 216 are rotatably arranged at both end portions of the roller units 211 and 212 in the X direction. A pressing spring 232 is arranged between the image sensor 206 and the sensor holder 217, and continuously presses the image sensor 206 against the back surface of the document platen glass 202. Therefore, when the reading unit 207 moves in the X direction, the pair of rollers rolls on the two dotted lines D1 and D2 illustrated in FIG. 4 described above.

Figure 5D:
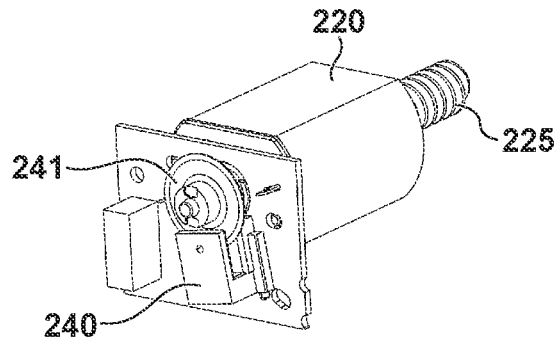

FIG. 5D is a detailed view of a motor unit including the motor 220. The reading unit 207 is provided with the motor 220 as a drive source. A code wheel 241 provided with a slit is fixed to the rotation shaft of the motor 220, and rotates together with the rotation shaft of the motor 220. An encoder 240 for reading a slit of the code wheel 241 is also provided. By reading the slit of the code wheel 241 by the encoder 240, the rotation direction, the rotation speed, and the rotation amount of the rotation shaft of the motor 220 can be controlled.

Figure 6:
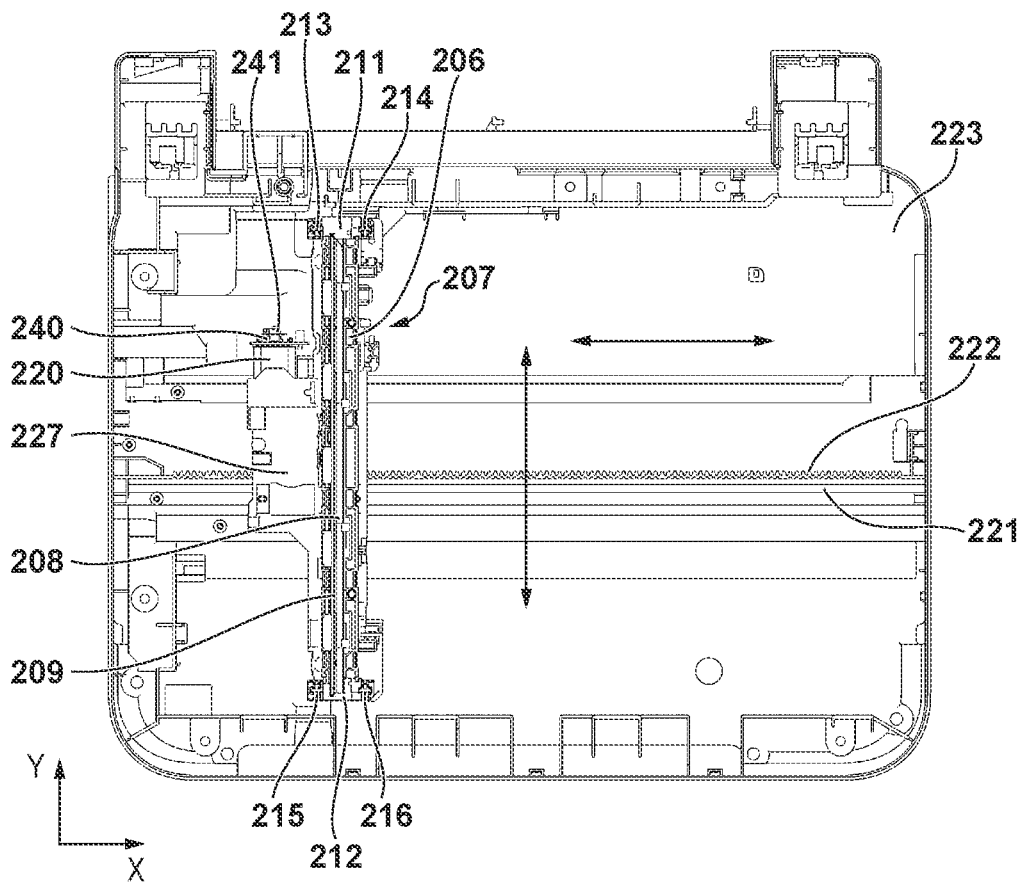
FIG. 6 is a plan view illustrating an internal configuration of the image reading apparatus according to one embodiment.

FIG. 6 is a plan view illustrating a state in which the glass frame unit 201 is removed from the plan view illustrated in FIG. 3A to illustrate an overall configuration of the inside of the scanner unit 200, and FIG. 6 illustrates the arrangement and configuration of the reading unit 207 and a base frame 223.

A guide rail 221 whose longitudinal direction is X direction and a rack 222 adjacent to the guide rail 221 are arranged at a substantially central portion of the base frame 223 in the Y direction. The slider 218 of the reading unit 207 described above is arranged to be slidable in the X direction with respect to the guide rail 221. Further, the drive gear 219 of the reading unit 207 described above is arranged so as to mesh with the rack 222.

Accordingly, when an input signal for driving is inputted to the motor 220, the drive gear 219 rotates in response to the input, meshing with the rack 222, and the reading unit 207 can thereby reciprocally scan along the guide rail 221.

In the present embodiment, an example of a so-called self-propelled reading unit in which the driving unit is arranged in the reading unit 207 is illustrated, but various embodiments of the present disclosure can also be applied to a belt-driven type in which the driving unit is arranged in the base frame 223 and the driving force is transmitted by a belt.

Hereinafter, the electrical configuration of the reading unit 207 will be described with reference to FIG. 7 and FIG. 8.

Figure 7:
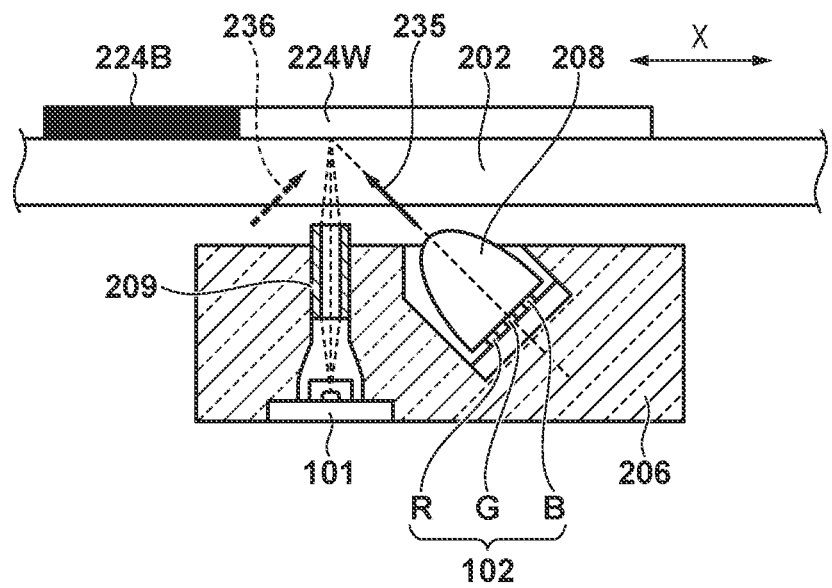
FIG. 7 is a sectional view of an image sensor according to one embodiment.

FIG. 7 is a cross-sectional view of an image sensor (line image sensor) 206. The image sensor 206 incorporates therein three different color light emitting elements 102 (LED), a rod lens array 209 arranged in a line in the Y direction, and a light receiving element 101 arranged in a line in the Y direction. Light emitted from the LEDs 102 to the document is reflected by the document surface, and the reflected light is transmitted through the rod lens array 209 to form an image on the light receiving element 101. The three different color LEDs 102 are switched sequentially and turned on, and the light receiving element 101 reads the reflected light from the document for each color, so that color separation reading can be performed.

Figure 8:
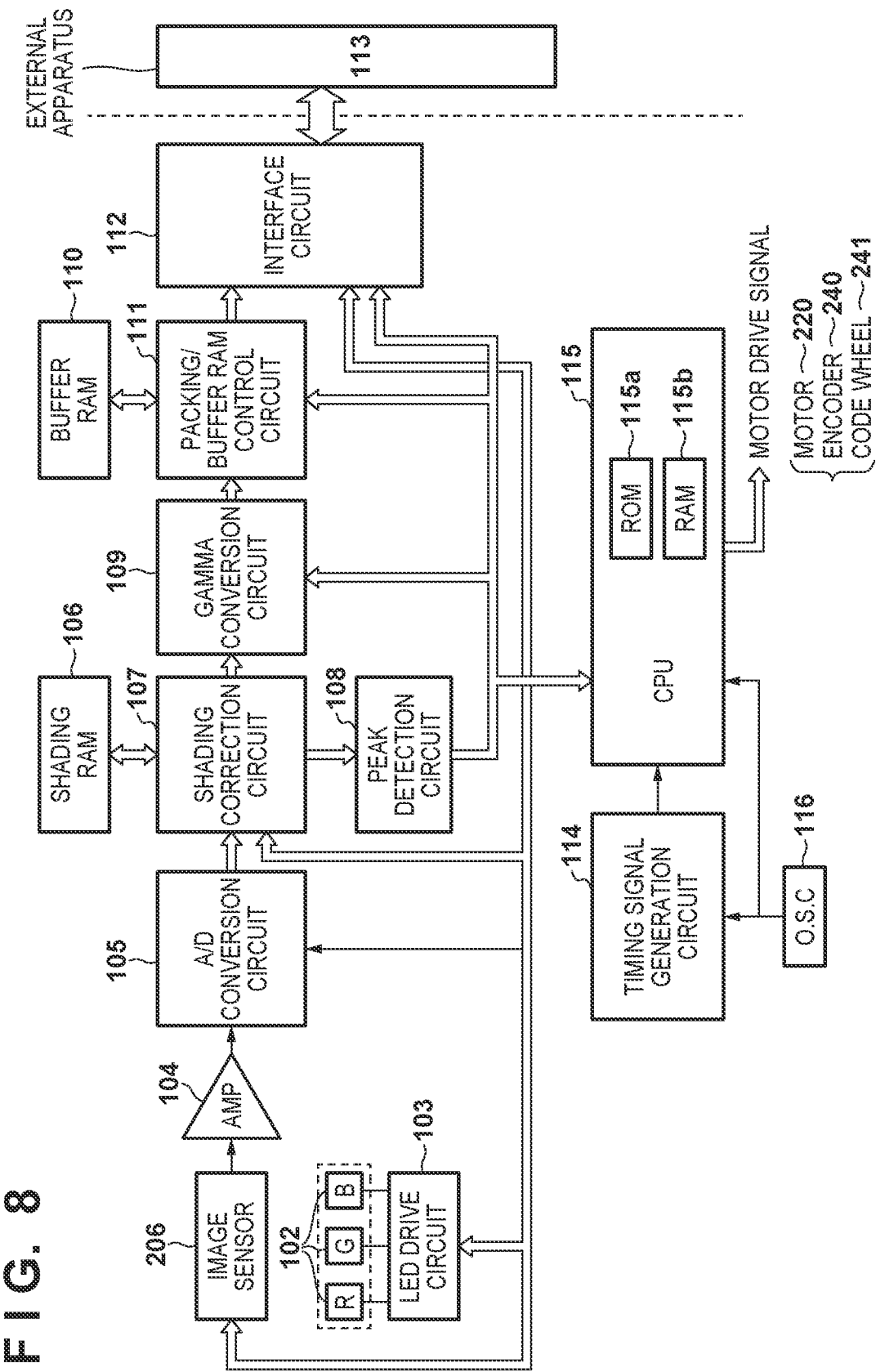
FIG. 8 is a block diagram illustrating a configuration of an electric circuit of the image reading apparatus according to one embodiment.

FIG. 8 is a block diagram illustrating a configuration of an electric circuit of the reading unit 207 according to the present embodiment. The operation of this circuit will be described below.

In FIG. 8, the image sensor 206 is configured by integrating the three different color LEDs 102 which are light sources. The image sensor 206 is caused to move in X direction under the document platen glass 202. At the same time, by switching which of the LEDs 102 of the respective colors is turned on for each line by an LED drive circuit 103, it is possible to read RGB line sequential color images.

An amplifier (AMP) 104 amplifies the signal outputted from the image sensor 206. An A/D converter 105 A/D converts the amplified output and outputs an 8-bit digital-signal, for example. A shading RAM 106 stores data for shading corrections obtained by calculating data obtained by reading the white region 224W described above. A shading correction circuit 107 performs shading correction on the image data read by the image sensor 206 based on the data of the shading RAM 106.

A peak detection circuit 108 is a circuit that detects a peak value in the read image data on a line-by-line basis, and is used to detect a reference position of the reading unit 207. A gamma conversion circuit 109 performs gamma conversion of the read image data in accordance with a gamma curve set in advance by a host computer to be described later. A buffer RAM 110 is a memory that primarily stores image data in order to match the timing of actual read operations with communication with the host computer.

A packing/buffer RAM control circuit 111 performs a packing process according to an image output mode (2-bit, 4-bit multi-valued, 8-bit multi-valued, 24-bit multi-valued, and the like) set in advance from the host computer, and then performs a process of writing the data into the buffer RAM 110, and a process of transferring the image data from the buffer RAM 110 to an interface circuit 112 and causing the image data to be output. The interface circuit (transfer unit) 112 receives control signals from and outputs image signals to an external device 113 serving as the above-described host device (computer) such as a personal computer.

A CPU 115 composed of a microcomputer has a ROM 115a storing a process procedure and a RAM 115b for operation, and controls each unit in accordance with a program procedure stored in a ROM 115a. The CPU 115 controls the rotation direction, the rotation speed, and the rotation amount of the rotation shaft of the motor 220 by reading the slit information of the code wheel 241 fixed to the rotation shaft of the motor 220 by the encoder 240. That is, the moving direction, moving speed, moving distance, etc. of the reading unit 207 are controlled. An oscillator 116 is, for example, a crystal oscillator, and a timing signal generation circuit 114 divides the output of the oscillator 116 according to the CPU 115 setting to generate various timing signals serving as a reference for the operation.

Here, in the present embodiment, the border between the black region 224B and the white region 224W described above serves as a reference mark for image reading by the image sensor 206. The position of the reference mark (the border position between the black region 224B and the white region 224W) read by the image sensor 206 is detected by the encoder 240, and is stored as a reference position in the RAM 115b in the CPU 115.

A detection unit that detects the mark and a control unit that determines the reference position of the image sensor 206 by the detected mark and starts reading the image are realized by the CPU 115. An initialization movement of the image sensor 206 before reading out the image when the power is turned on is performed based on the reference position determined by the reference mark detected in X direction. Further, the movement of the image sensor 206 after the image is read out is performed based on the reference position read out from the RAM 115b.

Next, operation of the reading unit 207 will be described with reference to FIG. 9A to FIG. 15. Reference symbols a, b, c, d, e, f, and g in FIG. 9A and FIG. 9B respectively indicate that the optical center of the rod lens array 209 of the image sensor 206 (the dashed-dotted line in FIG. 9A) is at a position a prior to the power being turned on, an initialization position b, a reference position detection position c, a home position d (shading start position), a shading end position e, a document image read start position f, and an ADF read position g. In the drawing, the reference position detection position c is simplified as the border position between the white region 224W and the black region 224B in the cross-sectional view, but in practice, the white region 224W and the black region 224B have configurations as described in FIG. 4.

Figure 9A:
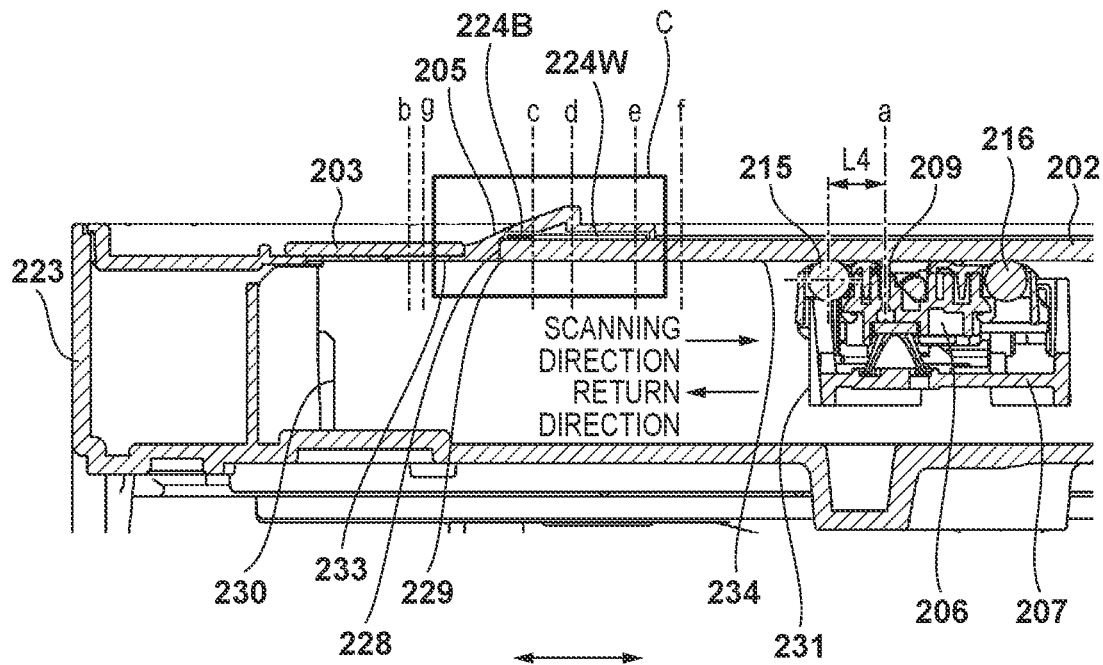
FIG. 9A and FIG. 9B are cross-sectional views illustrating a position of the reading unit from when the power is turned on until before image reading according to one embodiment.

The reading unit 207, prior to the power being turned on, is positioned at a location indicated by reference symbol a illustrated in FIG. 9A. However, the position of the reading unit 207 in X direction before the power is turned on may be a position other than the position indicated by a, since an initialization operation is always performed after the power is turned on.

Since there is no positional information in the memory of the apparatus immediately after the power is turned on, the reading unit 207 always moves in the return direction, and the reading unit 207 moves until a sensor holder contact portion 231 of the sensor holder 217 contacts an inner wall 230 of the base frame 223 of the apparatus main body. This operation corresponds to the operation (initialization operation) of step S101 in the flowchart of FIG. 12.

Figure 10A:
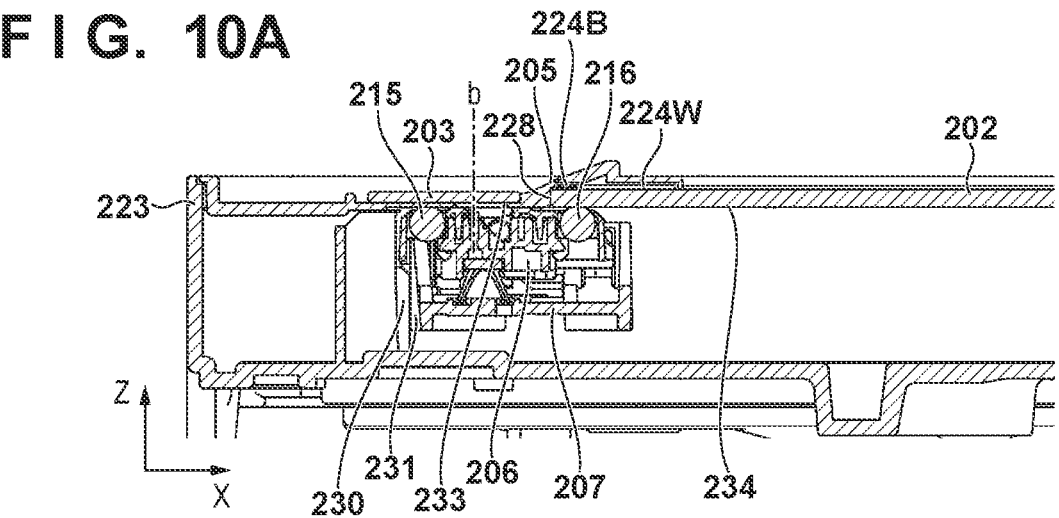
FIGS. 10A to 10C are cross-sectional views illustrating a position of the reading unit from when the power is turned on until before image reading according to one embodiment.

Thereafter, since the reading unit 207 cannot move any more, the load on the motor 220 driving the reading unit 207 increases, and the current supplied to the motor increases in proportion thereto. A characteristic of the motor 220 is used to set a threshold value for the current value, and when the current value reaches a certain value, the reading unit 207 is determined to have contacted the inner wall of the base frame 223. At this time, the reading unit 207 is at the initialization position b (FIG. 10A). At this time, the roller 215 is in contact with the glass frame guide surface 233, and the roller 216 is in contact with the back surface 234 of the document platen glass 202.

Figure 10B:
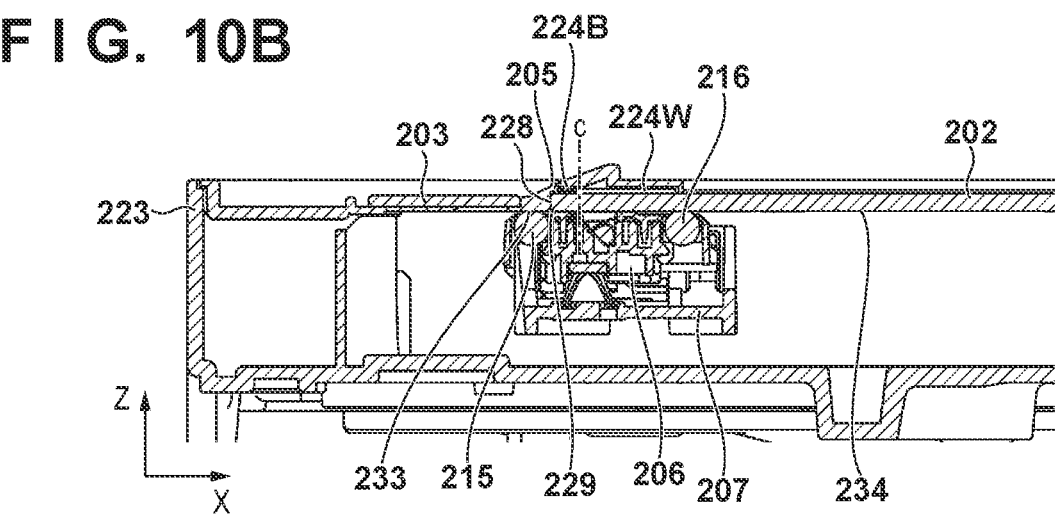

Next, the reading unit 207 starts moving in the positive X direction in order to detect the reference position c at the border portion between the white region 224W and the black region 224B on the white sheet 224. The image sensor 206 reaches a position where the reference mark is to be read (FIG. 10B). When the image sensor 206 detects the reference mark (the border position between the white region 224W and the black region 224B), the CPU 115 sets the reference mark detection position as the reference position c based on the signal from the encoder 240. This operation corresponds to the operation of step S102 in the flowchart of FIG. 12.

Figure 10C:
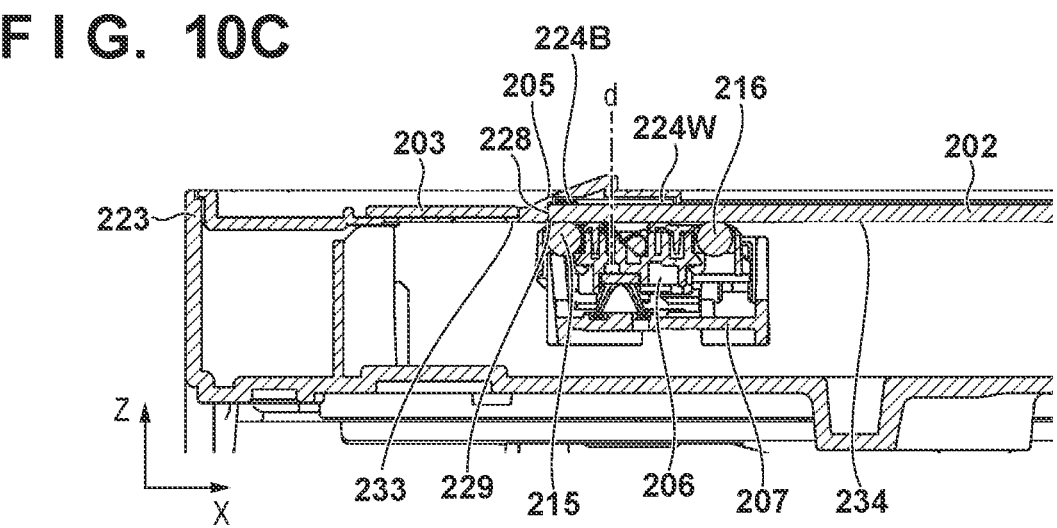

Here, as described above, the roller 215 and the roller 216 are in contact with planes of the different members. By design these are flush, but in reality, they will not be flush due to error in part precision. FIG. 10C illustrates a state in which both rollers 215 and 216 are in contact with the back surface 234 of the document platen glass 202. The posture of the image sensor 206 when reading the reference mark in FIG. 10B will be different from the ideal posture of the image sensor 206 as illustrated in FIG. 10C. However, for the following reasons, the difference in the posture of the image sensor 206 will not affect the precision in reading the reference mark.

In general, the image sensor 206 has a wide dynamic range. By way of example, it is sufficient to read successive gray level changes from black to white with an 8-bit resolution of 0 to 255. The reference position c is detected by reading the reference mark in a monochrome binarization mode of the image sensor 206. Therefore, even if the posture of the image sensor 206 is inclined due to the component precision, since the dynamic range is wide, the effect will not be to an extent that the discrimination of the binarization will be erroneous.

Figure 9B:
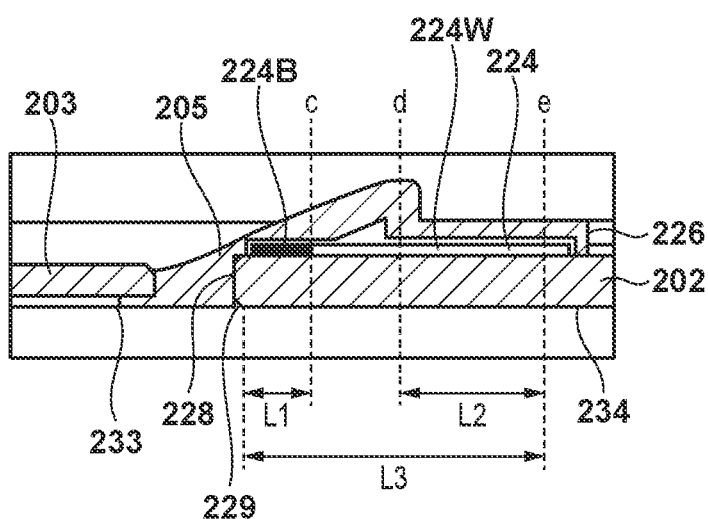

At the position c at which the reference position is detected, the roller 215 maintains a state of being in contact with the glass frame guide surface 233, and is located at a position sufficiently away from the discontinuous step between a glass frame contact surface 228 and the chamfered portion 229 of the document platen glass 202. This means that, as illustrated in FIG. 9B, the relationship between the length L1 from the reference position c to the document platen glass chamfered portion and the length L4 (see FIG. 9A) from the optical center of the rod lens array to the apex of the roller 215 is L1<L4. Accordingly, the roller, that is, the reading unit 207 can be moved in a stable posture without shock due to the step, and therefore the reference position can be precisely detected. Further, since the roller 215 is beyond the glass frame contact surface 228 and the document platen glass chamfered portion 229 and is not located on the document platen glass 202 side, the operation range of the reading unit 207 is narrow. Therefore, it contributes to a reduction of the device width.

The reference position c detected at the time of moving in the scanning direction (the X direction) at this time is stored in the RAM 115b as the reference position of the flatbed reading method. This operation corresponds to the operation of step S103 in the flowchart of FIG. 12.

Next, the reading unit 207 moves from the reference position c to a position (home position d), moving the predetermined amount in the scanning direction according to an instruction from the CPU 115. This operation corresponds to the operation of step S104 in the flowchart of FIG. 12.

In the present embodiment, the home position d is set to a shading start position (FIG. 10C). In the process of moving from the reference position c to the home position d, the roller 215 of the reading unit 207 passes over the step between the glass frame contact portion 228 and the chamfered portion 229 of the document platen glass 202 from the reference position detection position c. Then, it comes into contact with the back surface 234 of the document platen glass 202 as with the roller 216. Up until this point is an operation in which the image sensor 206 performs an initialization operation after the power is turned on, detects the reference position, and moves to the home position.

Next, the operation of the reading unit 207 at the time of flatbed reading will be described.

Figure 11A:
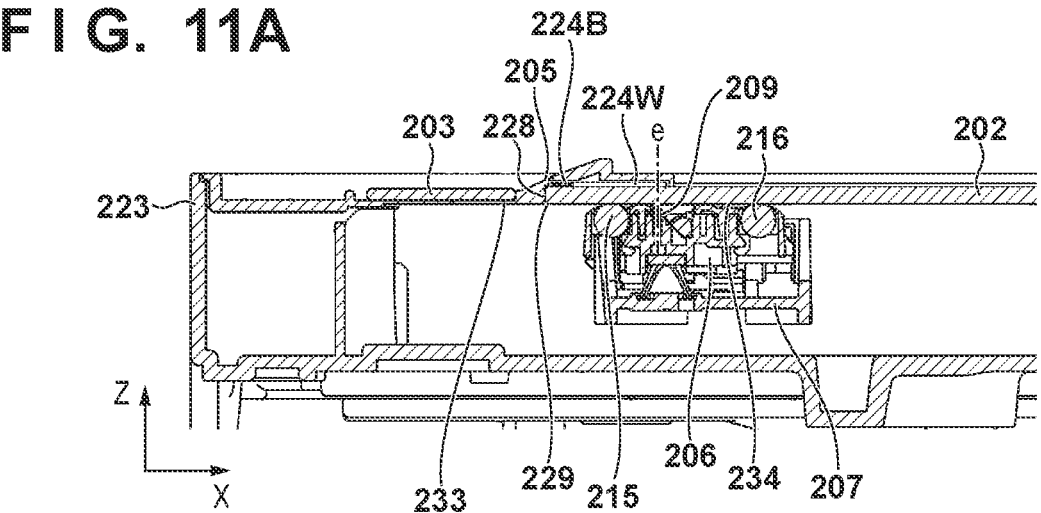
FIGS. 11A to 11C are cross-sectional views illustrating a position of the reading unit from when the power is turned on until before image reading according to one embodiment.

Prior to reading an image, the reading unit 207 performs a shading process of the image sensor 206 according to an instruction from the CPU 115. The white region 224W is read at a predetermined reading resolution from the home position d, which is the shading start position, to a position a predetermined length (shading end position e) away in the scanning direction (positive the X direction), and the shading process is ended (FIG. 11A). This operation corresponds to the operation of step S201 in the flowchart of FIG. 13.

In this shading process, the roller 215 and the roller 216 of the reading unit 207 remain in a state in which they are in contact with the flat region of the back surface 234 of the same document platen glass 202. Therefore, the shading processing is performed in the same posture as that at the time of image reading. Therefore, the similarity of the optical system is maintained, high-precision shading processing is performed, and high-quality image reading is guaranteed.

Figure 11B:
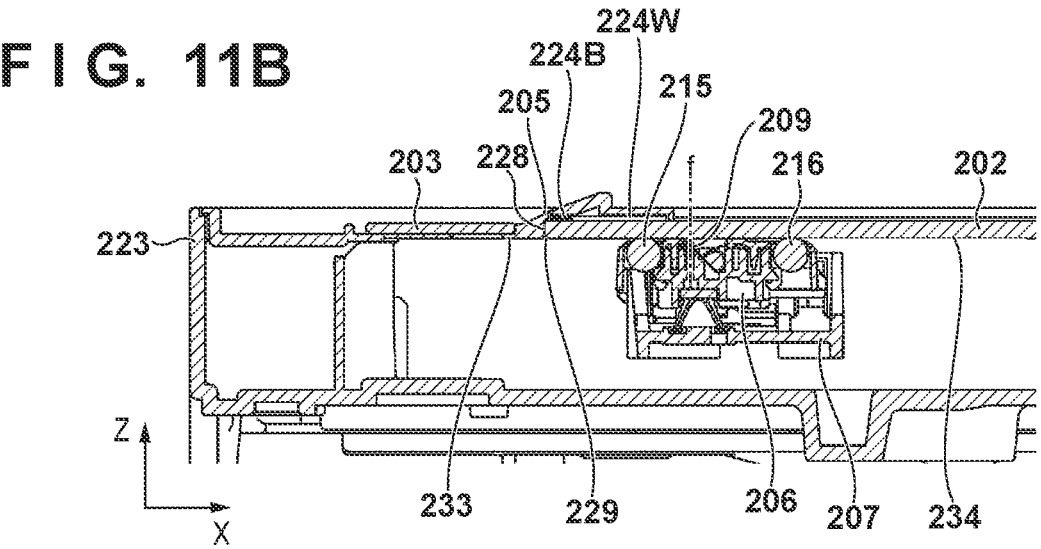

Next, the reading unit 207, from the reference position c stored in the RAM 115b, moves a prescribed distance, accelerates in the scanning direction, reaches a stable reading speed, and thereafter starts image reading from the read start position f (FIG. 11B). This operation corresponds to the operations of step S202 and step S203 in the flowchart of FIG. 13.

According to the above configuration, the precision of the read position of the image sensor 206 is improved, and variations in the operation range of the image sensor 206 are reduced. In addition, when the shading process is performed, the rollers 215 and 216 arranged at both ends of the image sensor 206 in the lateral direction (X direction) need to be in contact with the back surface of the document platen glass 202. However, when the reference mark is read, only the roller 216 needs to be in contact with the back surface of the document platen glass 202. Therefore, the length of the document platen glass can be reduced. At the same time, since the shading precision is guaranteed, it is possible to achieve both an improvement in image quality and a reduction in the size of the apparatus.

After the reading operation is completed, the reference position is detected again in the scanning direction, the reference position c is stored in the RAM 115b, the reading unit 207 moves to the home position d, and the flatbed reading operation is completed. This operation corresponds to the operations of step S204 to step S206 in the flowchart of FIG. 13.

Next, the operation of the reading unit 207 at the time of an ADF read will be described.

When an ADF read is instructed by the CPU 115, the reading unit 207 moves from the home position d in the return direction (X direction). When the image sensor 206 detects the reference mark (the border position between the white region 224W and the black region 224B), the CPU 115 sets the reference mark detection position to be a reference position c' based on a signal from the encoder 240 (FIG. 10B). Since there is a backlash in the driving unit of the reading unit 207, the reference position c and the reference position c' do not coincide with each other, and therefore, in the present embodiment, the reference position c and the reference position c' are separately detected in movement in the scanning direction and the return direction of the reading unit 207. This operation corresponds to the operation of step S301 in the flowchart of FIG. 14.

The reference position c' at the time of movement in the return direction is stored in the RAM 115b as a reference of ADF reading method. This operation corresponds to the operation of step S302 in the flowchart of FIG. 14.

Figure 11C:
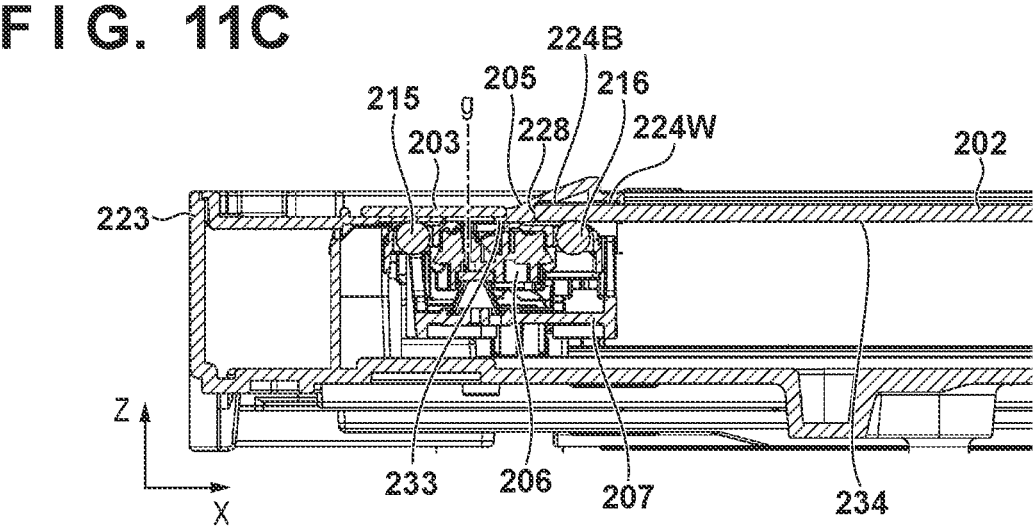

The reading unit 207 moves a predetermined amount from the reference position c' in the return direction and is positioned at the ADF read position g (FIG. 11C). This operation corresponds to the operation of step S303 in the flowchart of FIG. 14.

With the above-described configuration, since the detection reference position c' in the return direction is used at the time of movement in the return direction, the position precision at the time of the movement in the return direction can also be improved, variation in the position of the image sensor 206 can be reduced, and precision at the time of ADF reading can be improved.

When ADF reading is completed, the reading unit 207 moves in the scanning direction and detects the reference position c again (FIG. 10B). This operation corresponds to the operation of step S304 in the flowchart of FIG. 14.

The reference position c is stored in the RAM 115b and the reading unit 207 moves to the home position d. This operation corresponds to the operations of step S305 and step S306 in the flowchart of FIG. 14.

As described above, in the above-described embodiment, the reference position c is used as the reference position at the time of a flatbed read, and the reference position c' is used as the reference position at the time of an ADF read. This makes it possible to precisely move the reading unit 207 to a desired position without being affected by the backlash in the driving unit of the reading unit 207, thereby enabling highly precise reading at the time of each read.

Next, operation when a flatbed read or an ADF read is performed a plurality of times will be described.

If a flatbed read is performed after a flatbed read, the operation of FIG. 13 is performed, and then the operation of FIG. 13 is performed again.

Figure 14:
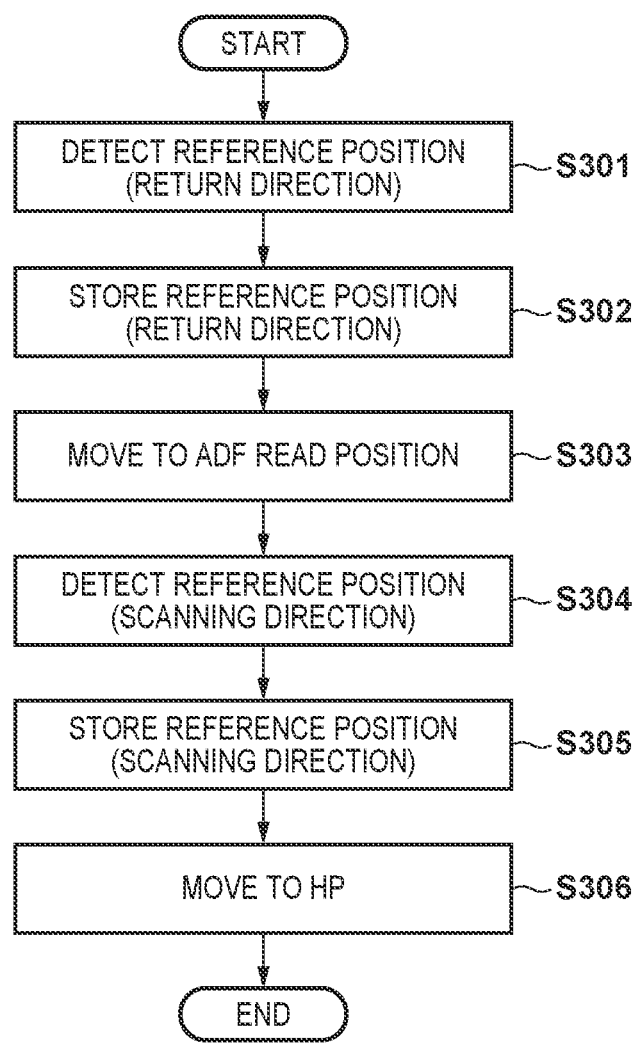
FIG. 14 is an operation sequence diagram for a time of an ADF read according to one embodiment.

If an ADF read is performed after a flatbed read, the operation of FIG. 13 is performed, and then the operation of FIG. 14 is performed.

If a flatbed read is performed after an ADF read, the operation of FIG. 14 is performed, and then the operation of FIG. 13 is performed.

If an ADF read is performed after an ADF read, the operation of FIG. 14 is performed, and then the operation of FIG. 14 is performed again.

The reference position c and the reference position c' stored in the RAM 115b are overwritten and held each time.

Next, the relationship between the images obtained by reading the white region 224W and the black region 224B in the white sheet 224 and the illumination direction in the image sensor 206 will be described.

FIG. 15 is a graph indicating the brightness level of an image obtained by the image sensor 206 reading the white sheet 224. FIG. 15 illustrates a distribution of a brightness level in the X direction corresponding to the E-E cross section in FIG. 4. The vertical axis indicates the brightness level, and the horizontal axis indicates the distance in the X direction.

The solid graph indicates the brightness level of the reflected light when light is emitted onto the white sheet 224 in the direction indicated by a solid arrow 235 in FIG. 7, and the dashed graph indicates the brightness level of the reflected light when the light is emitted in the direction indicated by a broken line arrow 236 in FIG. 7. The solid graph indicates the present embodiment, and the dashed graph indicates a comparative example.

In the present embodiment, since light is emitted in the direction of the solid arrow 235 in FIG. 7 (from the white region side toward the black region side), a light guide 208 is arranged on the white region 224W side in the drawing in the X direction with respect to the rod lens array 209. In addition, the light emission direction is a direction from the white region 224 side toward the black region 224B side in the drawing. On the other hand, in the comparative example, the light emission direction is the direction indicated by the broken line arrow 236.

In the solid-line graph of FIG. 15, the brightness level exhibits a constant value after moving a stabilization distance 1 (approximately 0.5 mm) into the white region 224W from the reference position c, which is the boundary. However, in the dashed curve, the brightness level exhibits a constant value after moving a stabilization distance 2 (approximately 5 mm) toward the white region 224W from the reference position c.

The white region within the stabilization distance cannot be used as a white region for shading correction because the white region is not a uniform white, but the stabilization distance is larger and the unusable area is larger in the case of the broken line as compared to the case of the solid line. This is because, when light is emitted from the black region 224B side to the white region 224W side, the brightness of the white region becomes slightly darker due to the effect of reflection of the black region.

In the present embodiment, the light emission direction is the direction of the solid arrow 235 illustrated in FIG. 7, and the light is emitted from the white region 224W side toward the black region 224B side. Therefore, the effect of reflection of the black region is not felt. Therefore, by setting the light emission direction to the direction of the present embodiment, the width of the white sheet 224 in the X direction can be minimized without lowering the shading precision. This makes it possible to achieve both an improvement in image quality and a reduction in the size of the apparatus.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-135204, filed Aug. 26, 2022, which is hereby incorporated by reference herein in its entirety.

What is claimed is:

1. An image reading apparatus, comprising:
an image sensor in which a light receiving element is arranged in a predetermined direction for reading a document;
a drive mechanism configured to cause the image sensor to move in a first direction intersecting the predetermined direction and a second direction opposite to the first direction;
a reference plate; and
a control unit configured to execute a first reading method of detecting a first reference position by driving the image sensor in the first direction and reading the reference plate, driving the image sensor in the first direction, and then reading a document, and a second reading method of detecting a second reference position by driving the image sensor in the second direction and reading the reference plate, and thereafter reading a document by driving the image sensor in the second direction.

2. The image reading apparatus according to claim 1, wherein the drive mechanism has a backlash, and a position of the image sensor shifts due to the backlash between a case of causing the image sensor to move in the first direction and a case of causing the image sensor to move in the second direction.

3. The image reading apparatus according to claim 1, wherein the control unit uses the first reference position as a reference position for the case of causing the image sensor to move in the first direction and uses the second reference position as a reference position for the case of causing the image sensor to move in the second direction.

4. The image reading apparatus according to claim 1, further comprising a storage unit configured to store the first reference position and the second reference position.

5. The image reading apparatus according to claim 1, wherein in the first reading method, a document is read with the document fixed and the image sensor being caused to move in relation to the document, and in the second reading method, a document is read by the image sensor by causing the document to move.

6. The image reading apparatus according to claim 5, wherein in the second reading method, the control unit uses the second reference position as a reference to cause the image sensor to move in the second direction and position the image sensor at a position at which to read the document.

7. The image reading apparatus according to claim 1, wherein the control unit performs control to, in a case of detecting the first reference position, cause the image sensor to move in the second direction until the image sensor contacts a main body of the image reading apparatus, initialize a position of the image sensor, and thereafter, cause the image sensor to move in the first direction, and detect the first reference position by reading the reference plate by using the image sensor.

8. The image reading apparatus according to claim 1, wherein the reference plate comprises a white first region and a second region that is continuous with the first region and is a different color to the first region.

9. The image reading apparatus according to claim 8, wherein the second region is positioned more to the side of the second direction than the first region in the reference plate.

10. The image reading apparatus according to claim 8, further comprising an illumination unit configured to illuminate the document, and the illumination unit, in a case of reading the reference plate, emits light toward the second region from the first region.

11. A method for controlling an image reading apparatus comprising:
an image sensor in which a light receiving element is arranged in a predetermined direction for reading a document;
a drive mechanism configured to cause the image sensor to move in a first direction intersecting the predetermined direction and a second direction opposite to the first direction; and
a reference plate, the method comprising:
executing a first reading method of detecting a first reference position by driving the image sensor in the first direction and reading the reference plate, driving the image sensor in the first direction, and then reading a document, and a second reading method of detecting a second reference position by driving the image sensor in the second direction and reading the reference plate, and thereafter reading a document by driving the image sensor in the second direction.

12. The method for controlling the image reading apparatus according to claim 11, wherein the drive mechanism has a backlash, and a position of the image sensor shifts due to the backlash between a case of causing the image sensor to move in the first direction and a case of causing the image sensor to move in the second direction.

13. The method for controlling the image reading apparatus according to claim 11, wherein the first reference position is used as a reference position for the case of causing the image sensor to move in the first direction and the second reference position is used as a reference position for the case of causing the image sensor to move in the second direction.

14. The method of controlling the image reading apparatus according to claim 11, further comprising
storing the first reference position and the second reference position.

15. The method for controlling the image reading apparatus according to claim 11, wherein in the first reading method, a document is read with the document fixed and the image sensor being caused to move in relation to the document, and in the second reading method, a document is read by the image sensor by causing the document to move.

16. A non-transitory computer-readable storage medium storing a program for causing a computer to execute a method for controlling an image reading apparatus comprising: an image sensor in which a light receiving element is arranged in a predetermined direction for reading a document; a drive mechanism configured to cause the image sensor to move in a first direction intersecting the predetermined direction and a second direction opposite to the first direction; and a reference plate, the method comprising:
Executing a first reading method of detecting a first reference position by driving the image sensor in the first direction and reading the reference plate, driving the image sensor in the first direction, and then reading a document, and a second reading method of detecting a second reference position by driving the image sensor in the second direction and reading the reference plate, and thereafter reading a document by driving the image sensor in the second direction.

* * * * *